United States Patent
Ameye et al.

(10) Patent No.: US 7,140,169 B2
(45) Date of Patent: Nov. 28, 2006

(54) FEEDER CONTROLS FOR A FORAGE HARVESTER

(75) Inventors: Danny R. Ameye, Zonnebeke (BE); Stephan P. Deneir, Moorslede (BE)

(73) Assignee: CNH America LLC, New Holland, PA (US)

( * ) Notice: Subject to any disclaimer, the term of this patent is extended or adjusted under 35 U.S.C. 154(b) by 277 days.

(21) Appl. No.: 10/220,655

(22) PCT Filed: Feb. 28, 2001

(86) PCT No.: PCT/EP01/02266

§ 371 (c)(1),
(2), (4) Date: Nov. 27, 2002

(87) PCT Pub. No.: WO01/65919

PCT Pub. Date: Sep. 13, 2001

(65) Prior Publication Data

US 2003/0172638 A1    Sep. 18, 2003

(30) Foreign Application Priority Data

Mar. 6, 2000   (GB) .............................. 0005178.9

(51) Int. Cl.
*A01D 69/00*  (2006.01)
*A01D 75/18*  (2006.01)

(52) U.S. Cl. .................. 56/11.9; 56/10.2 J; 56/10.9; 56/16.4 R

(58) Field of Classification Search .............. 56/10.2 J, 56/10.9, 11.9, 16.4 R, 10.2 R, 16.4 A, 16.4 B, 56/10.8; 60/464, 466, 494, 424, 456; 460/2, 460/3
See application file for complete search history.

(56) References Cited

U.S. PATENT DOCUMENTS

| | | | | |
|---|---|---|---|---|
| 3,266,520 A | * | 8/1966 | McGuire et al. | 137/596.13 |
| 3,656,282 A | * | 4/1972 | Rauth | 56/1 |
| 3,681,948 A | * | 8/1972 | Naarup et al. | 69/22 |
| 3,999,359 A | * | 12/1976 | Jordan et al. | 56/27.5 |
| 4,193,248 A | * | 3/1980 | Gilleman | 460/3 |
| 4,332,127 A | * | 6/1982 | Staiert et al. | 460/3 |

(Continued)

FOREIGN PATENT DOCUMENTS

EP    0 102 665    5/1987

(Continued)

*Primary Examiner*—Thomas B. Will
*Assistant Examiner*—Alicia Torres
(74) *Attorney, Agent, or Firm*—Michael C. Harms; John William Stader; Stephen A. Bucchianeri

(57) ABSTRACT

An agricultural harvesting machine, such as a forage harvester comprises a set of feedrolls (20, 21, 26, 27) for feeding harvested crop material to a rotating cutterhead (36). The feedrolls are driven by a hydraulic drive means comprising a hydrostatic pump (123) coupled to the engine (70) of the harvesting machine, a hydrostatic motor (80) coupled to said feeder means (20, 21, 26, 27) and hydraulic circuitry (142, 143, 152) interconnecting the pump and the motor. The circuitry comprises a feeder arrest valve (165) which is operable to interrupt the oil flow from said hydrostatic motor (80), thereby arresting said feedrolls (20, 21, 26, 27). The hydrostatic motor (80) is provided with a flushing valve (156) for diverting part of the oil flow in said circuitry through said motor for lubricating and cooling the latter. The arrest valve (165) is provided in said circuitry (142, 143, 152) between the hydrostatic motor (80) and the flushing valve (156). This arrangement allows for an immediate and efficacious arresting of the feedrolls upon detection of a foreign object in the harvested crop.

8 Claims, 3 Drawing Sheets

U.S. PATENT DOCUMENTS

| | | | |
|---|---|---|---|
| 4,467,590 A * | 8/1984 | Musser et al. | 56/11.2 |
| 4,663,919 A * | 5/1987 | Stroh et al. | 56/11.2 |
| 5,464,371 A * | 11/1995 | Honey | 460/20 |
| 5,488,817 A * | 2/1996 | Paquet et al. | 56/10.2 R |
| 5,778,644 A * | 7/1998 | Keller et al. | 56/11.2 |
| 5,862,656 A | 1/1999 | Gernert | |
| 5,901,535 A * | 5/1999 | Duckinghaus et al. | 56/10.2 G |
| 6,318,056 B1 * | 11/2001 | Rauch et al. | 56/10.2 J |
| 6,324,822 B1 * | 12/2001 | Oliva | 56/10.2 J |
| 6,336,325 B1 * | 1/2002 | Gluck et al. | 60/468 |
| 6,397,570 B1 * | 6/2002 | Bohrer et al. | 56/10.2 J |
| 6,430,923 B1 * | 8/2002 | Meier | 60/464 |

FOREIGN PATENT DOCUMENTS

| | | |
|---|---|---|
| EP | 0 680 687 A1 | 11/1995 |
| FR | 2 173 352 | 10/1973 |
| FR | 2 737 386 | 2/1997 |

\* cited by examiner

FEEDER CONTROLS FOR A FORAGE HARVESTER

TECHNICAL FIELD OF THE INVENTION

The present invention relates to agricultural harvesting machines provided with feeder means for feeding harvested crop material to crop processing means. More particularly, it relates to feeder means which are driven by a hydraulic motor and which are provided with means for immediately arresting said feeder means upon detection of a foreign object in the crop material.

BACKGROUND ART

It is well known in the art to provide agricultural harvesting machines, such as forage harvesters, with an apparatus for detecting foreign material in the stream of crop material which is being fed to a crop processing unit, such as a rotating cutterhead co-operating with a stationary shear bar. Such detector apparatus may be a metal detector of the type described in EP-B-0,102,665. The signal generated by this detector is fed to feeder arrest means, which provoke an immediate stop of the means feeding the crop material to the cutterhead. Thus is prevented that stray metal objects, which were picked up from the field, reach the cutterhead and cause serious damage to the knives and the shear bar. The arrest system also prevent that smaller metal particles are comminuted by the cutterhead and mixed with the crop which is fed to the cattle.

Typical mechanical arrest means as disclosed by U.S. Pat. No. 5,921,071 and U.S. Pat. No. 4,296,591 comprise a ratchet wheel which is mounted to the drive line of the feedrolls of the feeder means and a pawl which is positioned to engage this ratchet upon detection of metal. The movement of the pawl is controlled by a solenoid which is operated by the foreign material detector. Actuation of the pawl has to be combined with the simultaneous deactivation of a clutch in the drive line of the feedrolls to prevent damage to the engine or components of the drive line.

The use of such clutch is not required when the feeder means are driven by a hydrostatic motor as described in EP-A-0,848,902. The hydraulic circuitry then may be equipped with an arrest valve which is operable to cut the oil flow to or from the motor upon detection of a foreign object as suggested by FR-A-2,173,352. Such systems may work satisfactorily when used on the former low capacity forage harvesters. However, it has been experienced that serious problems as to reaction. speed and life time emerged when such systems are applied to the present-day high capacity harvesters in which the rotating feedrolls have a greater kinetic energy. Especially the low reaction time is critical as the foreign object may have the time to reach the cutterhead.

It therefore is an object of the present invention to provide a drive and arrest system for the feeder means which, on the one hand, does not require a clutch which has to be disengaged upon detection of a foreign object, and, on the other hand, is sufficiently powerful and fast to halt the crop flow before the foreign object reaches the crop processing means, even on larger harvesters.

SUMMARY OF THE INVENTION

According to the present invention there is provided an agricultural harvesting machine, comprising:
    crop processing means operable to process harvested crop material;
    feeder means for feeding said harvested crop material to said crop processing means;
    motor means; and
    hydraulic drive means for providing driving power to said feeder means, said hydraulic drive means comprising a hydrostatic pump coupled to said motor means, a hydrostatic motor coupled to said feeder means and hydraulic circuitry interconnecting said hydrostatic pump and said hydrostatic motor;
    said hydraulic circuitry comprising a feeder arrest means operable to interrupt the oil flow from or to said hydrostatic motor, thereby arresting said feeder means;
    characterised in that:
    said hydrostatic motor is provided with a flushing means for diverting part of the oil flow in said circuitry through said motor and to an oil tank or a cooling means; and
    said feeder arrest means is provided in said circuitry between said hydrostatic motor and said flushing means.

This arrangement does not require any mechanical clutches or pawls to arrest the feeder means. The particular location of the arrest means precludes the escape of blocked oil via the flushing circuit, such that the motor can be stopped more abruptly and the passage of foreign objects into the crop processing means is prevented.

The flushing means may comprise a flushing valve arranged between the high pressure and the low pressure lines of the motor and the arrest means an arrest valve operable to block the high or low pressure line of the motor. Advantageously these valves are incorporated into a single valve assembly which is mounted to the motor housing. In this manner the volume of oil between the motor and the arrest valve can be limited, thus improving the reaction speed of the arrest system.

The hydraulic circuitry may also comprise valve means for hydraulically driving other components in the harvester while the feeder means are halted. For example the hydrostatic motor may be used for driving the crop processing means in a reverse sense, opposite to the normal, crop processing sense. On a forage harvester, this may be used for improved sharpening of the cutterhead knives. Also these valves may be incorporated into the valve assembly.

Where the arrest system has to assume a high energy load, it may be advantageous to use an arrest valve which is pilot controlled by a solenoid actuated control valve. To improve the reaction time of such pilot controlled valve it may be useful to provide the circuitry adjacent the motor with a hydraulic accumulator which is connected via the solenoid actuated valve to the pilot controlled valve.

For removing the hydraulic load on the motor after operation of the arrest means, the circuitry may comprise by-pass means. These by-pass means may be combined with the valves which are used for driving the crop processing means in a reverse direction.

The arrest means may be actuated by a foreign object detector, e.g. a metal detector or an acoustic stone detector, which generates a signal upon detection of a foreign object in the crop flow. The signal is received by a controller comprising signal processing means, which actuates the arrest means.

DESCRIPTION OF THE FIGURES

An agricultural harvesting machine in accordance with the present invention will now be described in greater detail, by way of example, with reference to the following drawings, in which.

DESCRIPTION OF A PREFERRED EMBODIMENT OF THE INVENTION

The terms "front", "rear", "forward", "rearward", "right" and "left" used throughout this specification are determined with respect to the normal direction of movement of the machine in operation and are not to be construed as limiting terms.

Figure 1:
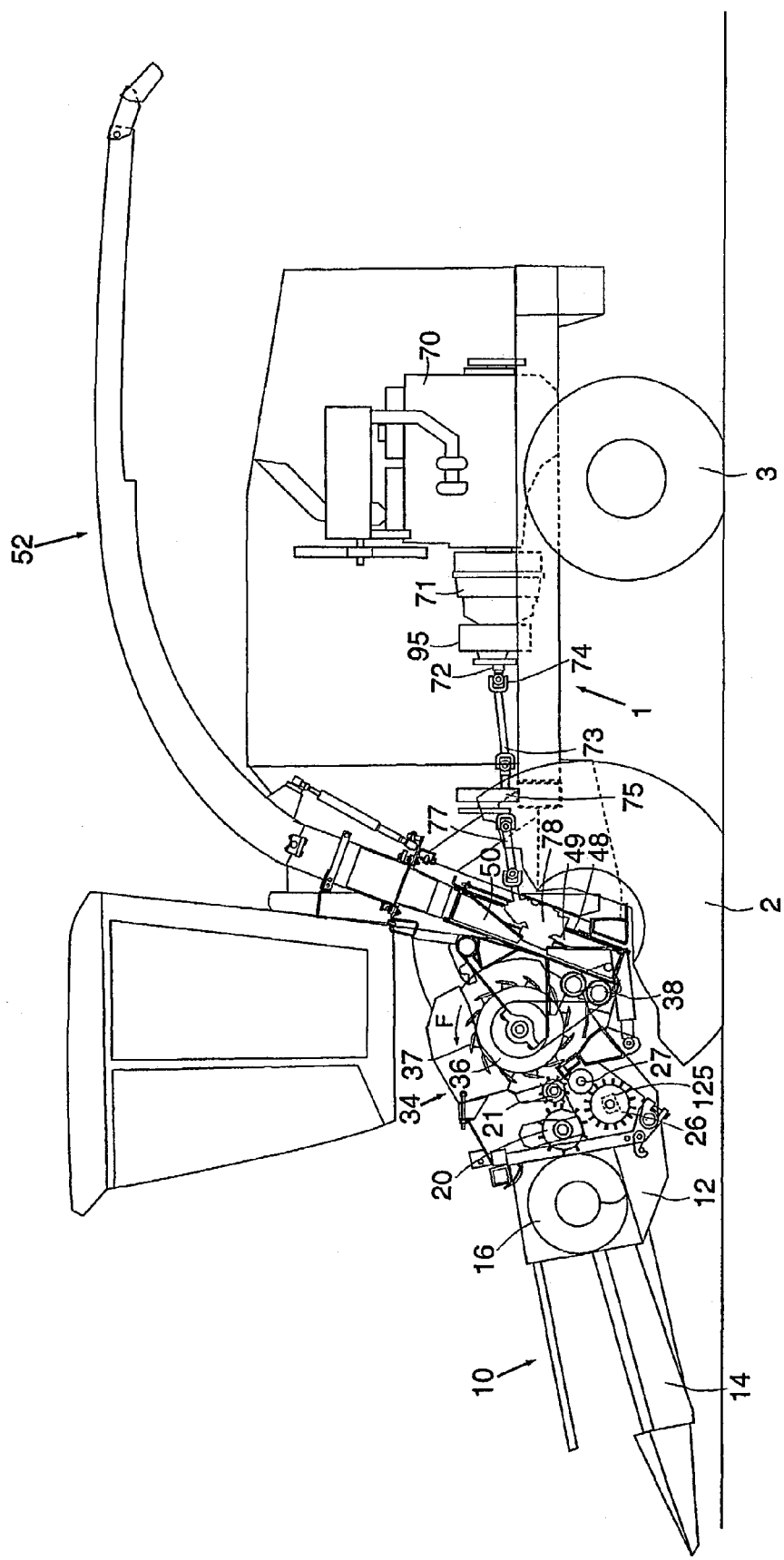
FIG. 1 is a schematic, side elevational view of a forage harvester, having an engine and a front unit, comprising a feedroll assembly and a cutterhead.

In FIG. 1, there is shown a forage harvester having a main frame 1 on which there are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwards to an auger 16, which in turn delivers the crop material to the bite of feeder means installed in a front unit of the forage harvester.

Said feeder means comprise lower feeder means, including a forward lower feedroll 26, and a smooth, rear lower feedroll 27, and upper feeder means, including a forward upper feedroll 20 and a rear upper feedroll 21. Said upper and lower feeder means are rotated to convey the crop material inbetween to a cutterhead 36, which is mounted within a cutterhead frame 34 and comprises a plurality of knives 37, generating a cylindrical peripheral shape or profile when the cutterhead 36 is rotated.

During normal harvesting operation, when the cutterhead 36 is rotated about a shaft 39 in its normal operation sense, as indicated by arrow F in FIG. 1, the knives 37 cooperate with a fixed shearbar to cut the crop material to length and to project it to a pair of counter-rotating crop processor rolls 38, which crack the whole kernels which are left in the chopped material. The rolls 38 deliver the crop to a blower rotor 49 which is installed within a blower housing 48. The blower rotor 49 comprises a plurality of paddles 50, which throw the material upwardly through the blower outlet into a discharge spout 52, which can be positioned by an operator to direct the cut crop material as required, normally into a wagon which is moving alongside or behind the forage harvester.

Above the cutterhead 36, there may be mounted a knife sharpening device (not shown), comprising a sharpening stone. During sharpening operation the stone is moved to-and-fro between the side plates of the cutterhead frame 34, while the stone is gradually lowered towards the rotating cutterhead 36. In order to obtain optimum cutting edges for the knives 37, the cutterhead 36 is rotated in a sense opposite to the normal operation sense, indicated by arrow F.

As shown in FIG. 1, the forage harvester is driven by a power plant or engine 70, to which a power-take-off (PTO) gearbox 71 is drivingly connected. The output shaft 72 of the PTO gearbox 71 is linked to a universal joint 74 of a drive shaft 73, whereof another universal joint 74 is linked to a transmission 75. An output shaft of the transmission 75 is connected to a blower drive shaft 77, which drives a blower gearbox 78 which supports and rotates the blower rotor 49.

Figure 2:
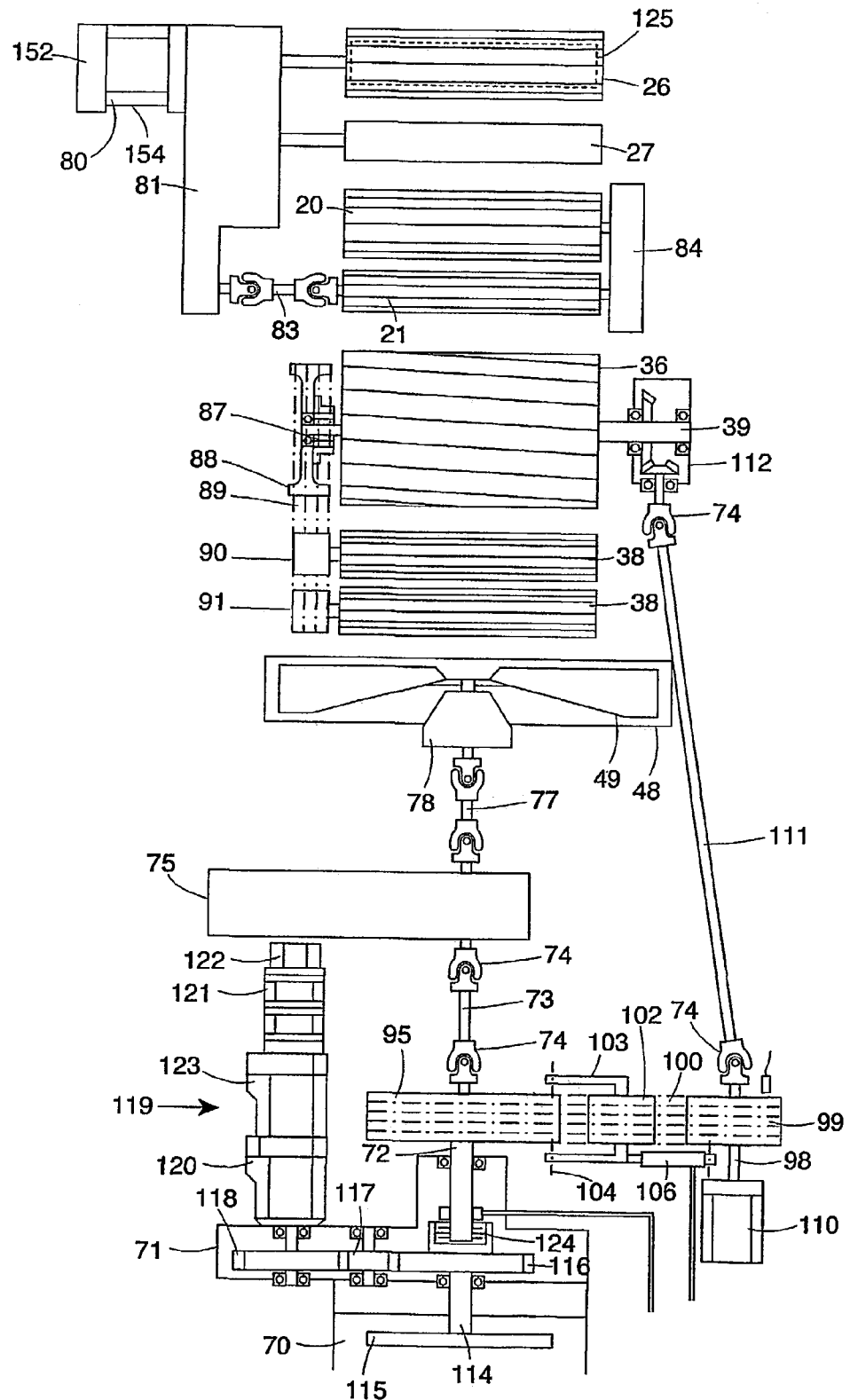
FIG. 2 is a schematic view of the drive lines and the driven components of the forage harvester of FIG. 1.

The feeder means are driven by a hydrostatic motor 80 which drives a lower feedroll transmission 81 on the left hand side of the front unit, shown in FIG. 2. This transmission 81 is connected directly to the lower feedrolls 26, 27 and through a drive shaft 83 to the rear upper feedroll 21. On the right hand side of the front unit, an upper feedroll transmission 84 drivingly interconnects the upper feedrolls 21, 20.

The cutterhead axle 39 carries at its left hand end the inner ring of an overrun clutch 87. The outer ring thereof is mounted to a grooved sheave 88. When the cutterhead 36 is rotated in the sense indicated by arrow F in order to comminute incoming crop material, the clutch 87 engages and the sheave 88 entrains a transmission belt 89. Otherwise, when the rotation of the cutterhead 36 is reversed, as during a sharpening operation, the clutch 87 disengages and the sheave 88 stands still.

The transmission belt 89 drives a smooth sheave 90 connected to the lower crop processor roll 38 and a grooved sheave 91 connected to the upper crop processor roll 38.

The output shaft 72 of the PTO gearbox 71 carries a grooved PTO sheave 95, to which the universal joint 74 of the drive shaft 73 is mounted. The sheave 95 drives by means of a transmission belt 100 a sheave 99 carried by a shaft 98. The transmission belt 100, running over both sheaves 95, 99, can be tensioned by means of an inner idler roll 102, which is rotated in an idler arm assembly 103, which is pivoted about a journal 104, extending from the PTO gearbox 71. The idler roll 102 is loaded by a hydraulic cylinder 106.

A hydraulic gear motor 110 is coupled to the rear end of the shaft 98. A cutterhead drive shaft 111 is connected by a universal joint 74 to the front of the sheave 99. The other end of the drive shaft 111 is connected by another universal joint 74 to the input shaft of an angle transmission 112, which drives the cutterhead axle 39.

The PTO gearbox 71 comprises a PTO input shaft 114, which is coupled at its rear end to the flywheel 115 of the engine 70 and at its front end to a first spur gear 116, meshing with a second spur gear 117. The latter gear 117 drives a third spur gear 118, which receives the input shaft of a hydraulic pump assembly 119, comprising a first squash plate pump 120, which provides driving power to the traction wheels 2, a second squash plate pump 123, which provides driving power to the feeder means, and-gear pumps 121, 122. The PTO input shaft 114 is linked to the PTO output shaft 72 by means of a hydraulically actuated clutch 124. When fluid pressure is applied thereto, the clutch 124 becomes engaged and the output shaft 72 is rotated unitarily with the input shaft 114.

The feeder means are provided with a foreign object detector which is operable to provide a signal to a controller for arresting the feeder means upon detection of such object in the crop flow. In the present embodiment the detector is a metal detector 125 of the type described in EP-B-0,102,665. The detector 125 is installed inside the forward lower feedroll 26. The controller may comprise a microprocessor which is programmed to monitor the metal detector signal and to immediately generate a feeder arrest command when a metal object is detected.

Figure 3:
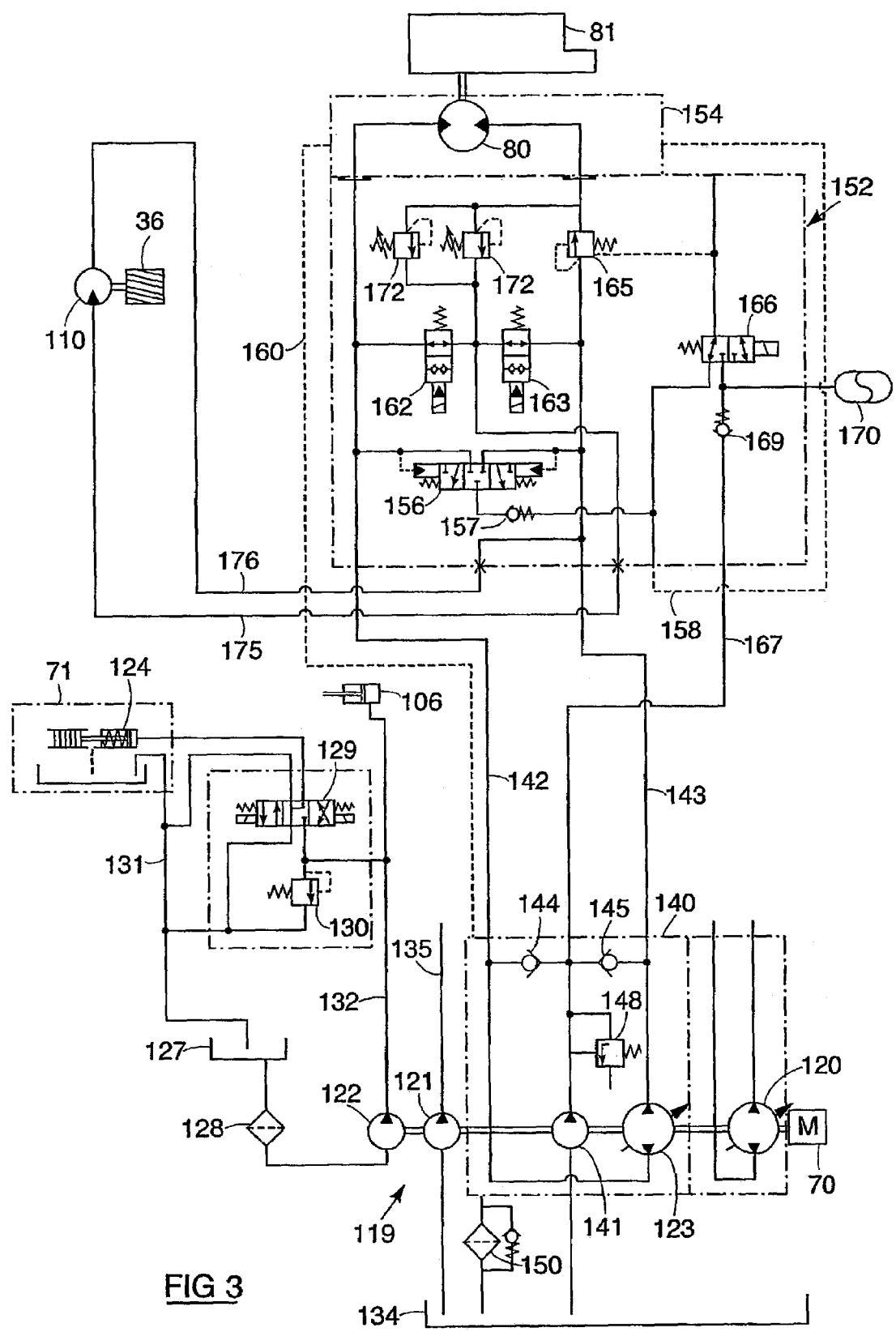
FIG. 3 is a scheme of a portion of the hydraulic circuitry of a forage harvester according to FIG. 1.

A portion of the hydraulic control system is schematically represented in FIG. 3. When the engine 70 is running, the hydraulic gear pump 122 draws oil from a shunt tank 127 through an oil filter 128 and feeds it via a hydraulic feed line 132 to a solenoid operated control valve 129 and the hydraulic cylinder 106 of the main belt transmission. One output port of the valve 129 is connected to the hydraulic clutch 124, the other is connected to the return line 131, which ends in the shunt tank 127.

Immediately after the start of the engine 70, the valve 129 is still in its rest position, as shown in FIG. 3, and the feed line 132 is pressurised, as to extend the cylinder 106. The pressure level is limited by a relief valve 130, which is equally connected to the feed line 132. The position of the valve 129 is controlled by an electrical circuit (not shown), comprising a programmable control unit, such as a microprocessor.

In order to engage the hydraulic clutch 124 and start rotating the cutterhead 36, the valve 129 is shifted to the right so that the pressure from the feed line 132 is applied to the piston of the clutch 124. Only a small amount of leakage oil drips from the clutch into the PTO gearbox 71, which is also connected to the return line 131. The feed line 132 and the cylinder 106 remain pressurised. Consequently, both the blower rotor 49 and the cutterhead 36 are driven by the engine 70.

The hydraulic oil from the clutch 124 also serves as a lubricant to the bearings and the gears 116, 117, 118 in the gearbox 71. Thereby most of the oil is mixed with air and divided over the inner surface of the gearbox 71, which makes the housing of the latter unsuitable for use as a tank from which the oil may be drawn by the gear pump 122. Therefore the surplus oil is delivered to the shunt tank 127, where it can settle before it is fed to the gear pump 122.

When the valve 129 is shifted to the left, the feed line 132 is connected to the return line 131, so that the pressure in the feed line 132 drops and the hydraulic clutch 124 disengages. Simultaneously the hydraulic cylinder 106 retracts under the action of the transmission belt 100, so that the cutterhead drive shaft 111 is disconnected from the blower gearbox 78. When the control valve 129 is shifted back to the right in order to re-engage the clutch 124, it passes through the middle position, in which only the cylinder 106 is pressurised. The idler roll 102 thus is loaded before the clutch 124 starts to rotate the PTO sheave 95. This operating sequence prevents unnecessary slippage of the belt 100, so that its lifetime will be extended.

The engine 70 is equally driving the gear pump 121, which draws hydraulic oil from an oil tank 134 and feeds it via another feed line 135 to a plurality of hydraulic actuators such as those controlling the position of the spout 52 or the level of the attachment 10.

The hydrostatic pumps 120 and 123, which are equally driven by the engine 70 are electronically controlled, preferably by the same controller that monitors the signal from the metal detector 125. In FIG. 3, the pump 123 driving the feeder transmission 81 is shown in some further detail, but the pump 120 driving the traction wheels 2. may be of the same squash plate pump type.

The hydrostatic pump 123 is incorporated in a pump housing 140, represented by phantom lines in FIG. 3. The pump 123 provides pressurised oil to the hydrostatic motor 80 through a high pressure line 142 and receives return oil through the low pressure line 143. The pump housing 140 comprises an oil feed pump 141 which constantly feeds oil to the hydrostatic circuitry. Oil drawn from oil tank 134 is pumped into one of the lines 143 or 142, whichever has the lowest pressure, via a check valve 145 or 144. Part of the oil provided by the feed pump 141 is discharged into the pump housing 140 via a pressure relief valve 148 for lubrication and cooling of the hydrostatic pump 123. The oil is drained into the oil tank 134 via a filter and heat exchanger 150.

The hydrostatic motor 80 on the transmission 81 receives oil from the hydrostatic pump 123 through a motor valve assembly 152 which is mounted to the housing 154 of the motor 80. The valve assembly 152 comprises flushing means deviating part of the oil flow in order to provide lubricant and coolant oil to the motor 80. In this embodiment the flushing means are constituted by a flushing valve 156 having three ports and three positions. The position of the valve is controlled by pilots connected to the high and the low pressure lines 142, 143. The two inlet ports are connected to the same lines and the outlet port is connected to a flushing line 158 via a spring loaded check valve 157. This valve 157 opens under a pressure lower than the pressure in the low pressure line. When pressurised oil is fed to the motor 80 through line 142, the flushing valve 157 is shifted to the right as seen in FIG. 3, thereby connecting the low pressure line 143 to the flushing line 158. Part of the return oil is deviated via check valve 157 to the motor housing 154 where it is used to lubricate and cool the motor parts. The used oil from the motor housing 154 is then fed through a further flushing line 160 to the housing 140 of the hydrostatic pump 123, where it is also used to lubricate to pump parts. From there the flushing oil is finally drained to the tank 134.

The motor valve assembly 152 also comprises by-pass means for deviating the oil from the high pressure line 142 to the low pressure line 143. In this embodiment, the oil can be deviated through a pair of solenoid operated valves 162, 163 having two ports and two positions. When the solenoids are actuated the valves are moved upwards, as seen in FIG. 3, to shut the connection between the lines 142 and 143 and to direct the oil flow from the high pressure line 142 to the hydrostatic motor 80. When the electrical current to the solenoids is cut, the valves 162, 163 return to their rest positions and oil from line 142 passes directly to line 143.

The low pressure line 143 between the hydrostatic motor 80 and the flushing valve 156 is provided with an arrest valve 165 which is operable to interrupt the oil flow from the motor, thereby immediately arresting the motor 80 and the feedrolls 20, 21 and 26, 27. The arrest valve 165 is spring loaded to cut the oil flow but a line pressure less then the operating pressure in the low pressure line 143 is already operable to open the valve against the force of the spring and to connect the motor 80 to the return line 143. This operating pressure follows from the opening pressure of the check valve 157 behind the flushing valve 156. The arrest valve 165 may be controlled directly by a solenoid. However, in view of the substantial. oil flow and the high power requirements involved, it is preferable to use a pilot controlled valve as shown in FIG. 3.

Herein the arrest valve 165 is controlled by a solenoid actuated control valve 166 having two positions and three ports. The control valve 166 receives pressurised oil from the oil feed pump 141 via a pressure line 167. When the solenoid is not energised, the pilot line of the arrest valve 165 is connected to the low pressure flushing line 158, such that the arrest valve remains open. When the control valve 166 is actuated, pressurised oil from the line 167 is fed to the arrest valve 165 which shuts the low pressure line 143 and stops the motor 80.

To improve the reaction time of the arrest valve 165 it is advantageous to provide a source of pressurised oil, such as an accumulator 170, adjacent the control valve 166. This accumulator is loaded through the pressure line 167 and the check valve 169. Upon actuation of the control valve 166, oil from the accumulator 170 is fed immediately to the arrest valve 165.

The sudden halt of the motor 81 may cause unallowable stress on its components. Therefore it may be necessary to allow a momentary escape of oil through one or more pressure relief valves 172 which by-pass the arrest valve 165. These relief valves open only at exceptionally high pressures.

Inbetween the two by-pass valves 162, 163, there is provided another hydraulic line 175 which is operable to provide oil to the gear motor 110 for driving the cutterhead 36 in a reverse sense. A return line 176 feeds the oil from the motor 110 back to the valve assembly 152 where it branches onto the low pressure line 143.

During normal operation of the harvester, the feedrolls 20, 21, 26 and 27 are rotated by the hydrostatic motor 80. The solenoids of the two by-pass valves 162, 163 are energised to shut the connection. between the high pressure line 142 and the low pressure line 143 and the oil from the hydrostatic pump 123 is forced through the motor 80. The control valve 166 is not actuated, such that no pressure is available at the right hand side of the arrest valve 165, which remains open under the pressure available in the low pressure line 143. The flushing valve 156 is shifted to the right to let a portion of the oil flow as a lubricant and coolant to the motor housing 154 via the flushing line 158. The rotation speed of the feedrolls is determined by the setting of the hydrostatic pump 123, which is controlled by the operator through the electronic controller. The speed can be varied to change the average length of cut for the harvested crop material.

When a foreign object is detected by the metal detector 125, the controller immediately energises the solenoid of control valve 166. Pressurised oil from the pressure line 167 or the accumulator 170 is provided to the pilot line of the arrest valve 165 which shifts to the left, thereby cutting the oil flow from the motor 80 to the low pressure line 143. The hydrostatic motor is arrested immediately, such that the foreign object cannot reach the rotating cutterhead 36. Simultaneously the controller de-energises the solenoids of the by-pass valves 162, 163, which return to their rest positions shown in FIG. 3. In this manner the high pressure line 142 is connected to the low pressure line 143 such that the oil from the hydrostatic pump 123 can circulate freely, without undue stress on the pump 123 or the motor 80.

To clear the foreign object from the feeder means, it is required to reverse the feedrolls and discharge the crop material forwardly. When the operator passes on a reversing command to the controller, the hydraulic pump 123 is reversed such that pressurised oil is now fed to line 143. When the reverse oil flow is realised the controller de-energises the control valve 166, such that arrest valve 165 might return to its open position. The by-pass valves 162 and 163 are actuated to close the by-pass circuit between the lines 143 and 142, such that the pressurised oil is forced in the reversed sense through the hydrostatic motor 80. Meanwhile the flushing valve 156 is shifted to the left to provide flushing oil from the line 142 to the flushing line 158. The controller limits the settings of the hydrostatic pump 123, such that the feedrolls 20, 21, 26, 27 are reversed at a slow rate. In this manner the crop material is deposited near the entrance of the feeder means, from where the operator can remove the foreign object.

The motor valve assembly is equally used to reverse the cutterhead 36 during sharpening operations. When the operator gives a reversing command to the control unit, the controller first uncouples the mechanical driveline to the cutterhead 36 by de-energising the control valve 129 of the clutch 124 as described above. The valve 129 returns to its rest position shown in FIG. 3. The speed of the cutterhead is monitored by the controller and when it has fallen below a predetermined threshold, the controller actuates the gear motor 110 on the cutterhead drive line. To this end the hydrostatic pump 123 is driven in its normal forward direction. The first by-pass valve 162 is opened, while the second by-pass valve 163 remains closed. The solenoid of control valve 166 is energised to make this valve feed pressurised oil to the arrest valve 165. In this manner the hydrostatic motor is blocked, while the oil from the high pressure line 142 is directed via the by-pass valve 162 and the line 175 to the reversing motor 110. The motor is driven in a sense opposite to the arrow F in FIG. 1. The oil returns through the line 176 to the motor valve assembly 152 and the low pressure line 143. The squash plate of the hydrostatic pump 123 is moved by the control unit to rotate the cutterhead 36 at a predetermined speed, independent of the setting needed for a wanted length of cut for the feeder means.

It will appreciated that thus is provided an effective and versatile means for driving and arresting a feeder means in an agricultural harvesting machine. Although the present invention has been described with reference to a forage harvester and a metal detector, other embodiments can be thought of without departing from the original idea of the invention. For example the metal detector 125 may be replaced with another foreign object detector, e.g. an acoustic stone detector. It is also conceivable to use the hydraulic circuitry to drive other types of feeder means, e.g. a belt conveyor, or to use the arrest means to stop only one or two of the feedrolls. The valve assembly may also be used to redirect the oil flow not only to the reversal motor of the cutterhead, but also to other hydraulic motors or actuators on the harvesting machine itself or on auxiliary devices, e.g. to drive or to move components on the crop collecting apparatus.

The invention claimed is:

1. An agricultural harvesting machine comprising:
crop processing means for processing harvested crop material;
feeder means for feeding the harvested crop material to said crop processing means;
an engine; and
hydraulic drive means for driving said feeder means, said hydraulic drive means comprising a hydrostatic pump coupled to said engine, a hydrostatic motor coupled to said feeder means and hydraulic circuitry interconnecting said hydrostatic pump and said hydrostatic motor,
said hydraulic circuitry comprising feeder arrest means operable to automatically interrupt the oil flow from or to said hydrostatic motor, thereby arresting said feeder means,
said hydrostatic motor including flushing means for diverting at least part of the oil flow in said hydraulic circuitry through said hydrostatic motor to an oil tank or a cooling means, said flushing means comprising a flushing valve, and
said feeder arrest means being disposed in said circuitry between said hydrostatic motor and said flushing means, said feeder arrest means comprising a feeder arrest valve, wherein said feeder arrest valve and said flushing valves are incorporated into a single valve assembly mounted to said hydrostatic motor.

2. The agricultural harvesting machine according to claim 1, further comprising foreign object detection means for generating a signal upon detection of a foreign object in the material flow fed to said crop processing means and signal processing means for actuating said feeder arrest means upon receipt of the signal from said foreign object detection means.

3. An agricultural harvesting machine comprising:
crop processing means for processing harvested crop material;
feeder means for feeding the harvested crop material to said crop processing means;
an engine; and
hydraulic drive means for driving said feeder means, said hydraulic drive means comprising a hydrostatic pump coupled to said engine, a hydrostatic motor coupled to said feeder means and hydraulic circuitry interconnecting said hydrostatic pump and said hydrostatic motor, said hydraulic circuitry comprising feeder arrest means operable to automatically interrupt the oil flow from or to said hydrostatic motor, thereby arresting said feeder means, said hydrostatic motor including flushing means for diverting at least part of the oil flow in said hydraulic circuitry through said hydrostatic motor to an oil tank or a cooling means, said flushing means comprising a flushing valve, and said feeder arrest means being disposed in said circuitry between said hydrostatic motor and said flushing means, said feeder arrest means comprising a feeder arrest valve, wherein said feeder arrest valve is pilot-controlled by a solenoid-actuated control valve, wherein said hydraulic circuitry comprises a hydraulic accumulator connected through said control valve to said feeder arrest valve.

4. The agricultural harvesting machine according to claim 3, wherein said hydraulic circuitry comprises by-pass means for directing the nil flow from said hydrostatic pump back to said hydrostatic pump while by-passing said hydrostatic motor.

5. The agricultural harvesting machine according to claim 4, further comprising a hydraulic actuator, wherein said by-pass means directs the oil flow from said hydrostatic pump to said hydraulic actuator.

6. The agricultural harvesting machine according to claim 3, wherein said crop processing means comprises a cutterhead for comminuting crop material, and said feeder means comprises a set of feedrolls.

7. A high-capacity agricultural harvesting machine comprising;
a feed roll;
an engine;
a hydrostatic pump coupled to said engine;
a hydrostatic motor coupled to said feed roll, said hydrostatic motor hydraulically connected to a low-pressure line and a high-pressure line;
a feeder arrest valve hydraulically connected to the low-pressure line, said feeder arrest valve including an open position and a closed position, whereby in the open position said feeder arrest valve allows hydraulic oil to flow past said feeder arrest valve and in the closed position said feeder arrest valve stops the flow of hydraulic oil thereby arresting said hydrostatic motor,
wherein said feeder arrest valve is normally open and displaced to the closed position by pressure in a pilot hydraulic line; and
a control valve and an accumulator, said control valve including a high-pressure position and a low-pressure position, wherein in the high-pressure position said accumulator is hydraulically coupled to said feeder arrest valve via the pilot hydraulic line.

8. The high-capacity agricultural harvesting machine according to claim 7, farther comprising foreign object detection means for detecting the presence of a foreign object in the vicinity of said feed roll, wherein said foreign object detection means actuates said control valve from the low-pressure position to the high-pressure position.

* * * * *